Patented Feb. 5, 1924.

1,482,793

UNITED STATES PATENT OFFICE.

MINER L. HARTMANN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

PROCESS FOR TREATING SURFACES OF CRYSTALLINE MINERAL MATERIAL.

No Drawing. Application filed July 16, 1921. Serial No. 485,389.

*To all whom it may concern:*

Be it known that I, MINER L. HARTMANN, a citizen of the United States, residing at Niagara Falls, in the county of Niagara and State of New York, have invented a new and useful Improvement in Processes for Treating Surfaces of Crystalline Mineral Materials, of which the following is a full, clear, and exact description.

My invention relates to a new process for treating the surfaces of crystalline mineral materials; and its object is to etch, pit or roughen the grain surfaces and thereby increase their bonding qualities. This treatment is suitable for use with a large number of natural and artificial abrasives and refractories, such as silicon carbide, fused crystalline aluminous abrasives and naturally occurring crystalline minerals, such as corundum, emery, garnet, quartz, silica sand and the like; and in the following description and claims, the term "crystalline mineral materials" is to be understood to include artificial abrasives and refractories, such as silicon carbide, fused crystalline aluminous abrasives, and naturally occurring crystalline minerals, such as corundum, emery, garnet, quartz, silica sand, and the like.

When abrasive grains are held to other bodies or together by a bonding material, such as glue, rubber, shellac, vitrified clay, cement or other bonding materials, the efficiency of the abrasive article depends largely upon the adhesive strength between the grain surfaces and the bonding material.

I have discovered that by suitable means, the more or less smooth surfaces of crystalline mineral grains may be etched, pitted or roughened so that the adhesive strength between the grain and the bonding material is greatly increased.

In carrying out my invention, the grains are heated in contact with small particles of an acidic substance, more or less evenly distributed over the grain surfaces, to a temperature sufficient to produce a surface reaction between the acidic substance and the crystalline material, but insufficient to produce glazing or smoothing of the surfaces.

As an illustration of the method of practicing my invention, the material, for example, fused crystalline aluminous abrasive made by any of the well known methods, in grain form, is moistened with a saturated solution of boric acid. The moistened grain is then heated to about 500° C. for about one hour. After cooling, the grain may be washed with water, dried, and is then ready to be used in the abrasive article.

The crystalline mineral material used in my process may be crushed to the sizes required for the subsequent manufacture of abrasive articles, before treatment, or it may be crushed after treatment, although the former method is preferred because by it all the surfaces of each grain are etched, pitted, or roughened when treated by my process.

The method of distribution of the acidic substance on the grain surfaces is not limited to moistening the grain with the solution of the acidic substance and evaporating the liquid, but alternative processes may be used which distribute the acidic particles more or less evenly over the grain surfaces.

I have found that other acidic substance than boric acid may be used to produce this etching, as for example, phosphoric acid, fluosilicic acid, sulfuric acid, nitric acid, chromic acid, silicic acid.

Not only phosphoric acid, but salts of phosphoric acid, such as sodium ammonium hydrogen phosphate, calcium phosphate, sodium hydrogen phosphate, iron phosphate give the desired etching effect.

Salts of fluosilicic acid, as for example, sodium fluosilicate, potassium fluosilicate, barium fluosilicate, as well as fluosilicic acid are efficacious in producing the desired result.

Salts of sulfuric acid, such as iron sulfate, potassium aluminum sulfate, potassium hydrogen sulfate, magnesium sulfate, aluminum sulfate, as well as the sulfuric acid have been used for producing the desired etching.

The salts of chromic acid have been found effective, as for example, sodium chromate, barium chromate, sodium dichromate.

Salts of silicic acid, or silicates as for example, sodium silicate, zirconium silicate, aluminum silicate, and the various simple and complex aluminum silicates, represented by clay, kaolin, and feldspar, have been found to produce the desired etching.

Salts of nitric acid as for example, sodium nitrate and lead nitrate, as well as nitric acid give the desired etching effect.

Salts of boric acid, as for example sodium tetraborate give the desired etching effect.

I therefore do not limit myself to boric acid; and in this specification and appended claims the term "acidic substance" is to be understood to include the general group of acids and salts of these acids, as distinguished from alkalis.

The effectiveness of my invention for etching, pitting, or roughening the surfaces of abrasives and refractory grains, and thereby improving the bonding strength between grain surfaces and bonding material, may be proven not only by examination under the high power microscope, but also by means of the increased tensile strength of the bonded articles made with grain treated by my new process. By the use of the particular method above described, I have in one case increased the bonding strength of aluminous abrasive and glue by more than 200%, and in all cases the bonding strength has been greatly improved.

I claim:

1. The process of improving the bonding quality of fused crystalline aluminous abrasive grains, which consists in heating said material in contact with boric acid, substantially as described.

2. The process of improving the bonding quality of crystalline mineral materials, which consists in moistening the material with an acid and heating to a temperature sufficient to produce a surface pitting reaction, substantially as described.

3. The process of improving the bonding quality of crystalline mineral materials which consists in moistening the material with an acid and heating to a temperature sufficient to produce a surface pitting reaction between said material and the acid but insufficient to produce glazing of the surface of the material, substantially as described.

4. The process of improving the bonding quality of crystalline mineral materials, which consists in moistening the material with a surface pitting acidic substance and heating to a temperature sufficient to produce a surface pitting reaction, substantially as described.

5. The process of improving the bonding quality of crystalline mineral materials, which consists in moistening the material with a surface pitting acidic substance and heating to a temperature sufficient to produce a surface pitting reaction, but insufficient to produce glazing of the surface of the crystals, substantially as described.

6. The process of improving the bonding quality of fused crystalline aluminous abrasive grains, which consists in moistening such material with an acidic substance and heating it at a temperature sufficient to produce a surface pitting reaction but insufficient to produce glazing of the surface of the grains, substantially as described.

In testimony whereof I have hereunto set my hand.

MINER L. HARTMANN.